United States Patent Office 3,247,556
Patented Apr. 26, 1966

3,247,556
SAND MOLD PROCESS USING RESINOUS BINDER FROM ALKALINE CONDENSATION OF UREA, FORMALDEHYDE, AND FURFURYL ALCOHOL
Wayne H. Buell, Lathrup Village, and Mitchell S. Dombrowski, Oak Park, Mich., assignors to International Minerals & Chemical Corporation, Skokie, Ill., a corporation of New York
No Drawing. Filed Mar. 28, 1960, Ser. No. 17,744
9 Claims. (Cl. 22—193)

The present invention broadly relates to a composition and method for preparing a polymerizable resinous material, and more particularly to an improved urea-formaldehyde-furfuryl alcohol resin for use as a sand binding agent in the manufacture of sand molds and cores.

The increasing emphasis on automated manufacturing techniques has occasioned modernization of foundry facilities and practices whereby many types of sand molds and cores are now made in large quantities on automated machinery. A limiting factor on the rate at which sand molds and cores can be produced on modern automated foundry machinery has been the length of the cure cycle of the binding agents utilized to adhere the sand particles together. Frequently, the sand molds and sand cores after preliminary formation must be subjected to prolonged controlled heating cycles to finalize the curing of the binding agent in order to achieve the requisite strength of the mold or core. The slow curing characteristics of the binding agents heretofore used have contributed to inefficient foundry operation and an increased susceptibility of damage or breakage of the preliminarily formed molds and cores dure to the excessive handling required.

Conventional core oils used as binding agents such as linseed oil, fish oil, mineral oil, china-wood oil, synthetic core oils, etc. have been replaced during recent years in many sand mold and core applications by resinous binding agents such as, for example, phenol-formaldehyde and urea-formaldehyde resins. These thermosetting resinous binding agents are admixed with foundry sand either in the form of a dry powder or as a liquid solution and are hardenable by catalyzation and heat. The dry powdered form of the resinous binder is somewhat objectionable due to the dusting thereof during mixing with the sand and the difficulty of obtaining uniform distribution in the sand mixture. This factor ordinarily requires the use of quantities of the dry powdered resinous binder in excess of that normally required to assure that the cured sand mold or core has adequate strength. Resinous binders in the form of a liquid solution, on the other hand, facilitate obtaining a uniform coating on the sand particles at comparatively low concentrations and are generally preferred for this reason. Regardless of the form of resinous binders heretofore employed, their curing cycles are generally shorter than those of conventional core oils. However, with the advent of automated foundry machinery and modernization of foundry facilities, cure cycles substantially shorter than those obtainable with presently known resinous binders are necessary to achieve optimum utilization of equipment. In this regard, the resinous binding agents in the form of a liquid solution have the disadvantage of requiring additional time and heat to evaporate the solvents contained therein before the requisite mold or core strength is achieved. This factor further detracts from the efficiency obtainable with these resinous sand binders in modern foundry practices.

Accordingly, it is a primary object of the present invention to provide a unique resinous core binder that is substantially free of solvents and which has curing characteristics substantially more rapid than other resinous binders heretofore known.

Another object of the present invention is to provide an acid and heat hardenable urea-formaldehyde-furfuryl alcohol resin suitable for use as a core binder, and which resinous binder undergoes an exothermic curing reaction liberating heat which accelerates the curing thereof and assures a uniformly cured product.

Still another object of this invention is to provide an improved resinous core binder which can be used in comparatively low concentrations to produce sand molds and cores suitable for metal casting practices which have high strength and which have suitable collapsibility characteristics facilitating the removal thereof from the solidified completed casting.

A further object of this invention is to provide a unique acidic catalyst in the liquid form suitable for catalyzing the resinous core binder and which catalyst contains urea dissolved therein for stabilizing the solution and for minimizing the evolution and liberation of free formaldehyde and other fumes during the curing reaction of the resinous core binder.

The unique resinous core binder comprising the present invention is prepared by copolymerizing an agitated, heated mixture of urea, formaldehyde, and furfuryl alcohol at a pH greater than 7.0. After the materials have been reacted for a prescribed period of time, the mixture is cooled resulting in a substantially water-free liquid resin having a viscosity dependent on the proportions of the reactants employed and also upon the time and the temperature at which the reaction was carried out. Although the preferred resin is in a liquid form facilitating its mixing with and distribution through the sand mixture, it will also be appreciated that the resinous core binder can be produced in a solid form by varying the reaction times and temperatures which is also suitable for use as a sand binder. The urea-formaldehyde-furfuryl alcohol resin produced, whether in a liquid or in a solid form may be stored indefinitely at ordinary temperatures until ready for use. Final curing of the resin is achieved by adding thereto an acid catalyst in a quantity sufficient to reduce the pH below 7.0, whereby the excess hydrogen ion concentration causes the resin to harden through an exothermic reaction.

To achieve a resinous core binder having a high rate of cure when acid catalyzed, it has been found that the formaldehyde to urea molar ratio should be greater than 2:1 ranging upwards to about 4:1. Formaldehyde to urea ratios at or less than about 2.0:1 result in a resinous core binder having a rate of cure when catalyzed that is too slow to achieve satisfactory sand mold manufacture on automated foundry machines. On the other hand, molar ratios of formaldehyde to urea in excess of 4:1 cause an objectional evolution of fumes in many foundry installations during the exothermic curing reaction of the resin and accordingly it is preferred to limit the formaldehyde content for this reason. However, as the formaldehyde ratio is increased, the curing rate of the resin increases and resin compositions having formaldehyde to urea ratios of about 4:1 are preferred when the fumes liberated during the curing reaction do not constitute an objectionable feature or can be quickly removed by a suitable ventilating system. Generally, formaldehyde to urea ratios of about 2.4:1 to about 3.0:1 are satisfactory for most applications. The amount of furfuryl alcohol in the formulation may range within the limits from about 0.1 to about 1.7 moles of furfuryl alcohol per mole of urea used and preferably between about .7 mole to about 1.3 moles of furfuryl alcohol per mole of urea. It has been found that by increasing the molar content of furfuryl alcohol beyond the limits noted with respect to a fixed ratio of formaldehyde and urea, the rate at which the resin cures decreases resulting in a less desirable core binder. On the other hand, as the furfuryl alcohol molar ratio decreases, the resultant resin binder becomes less suitable for making molds for casting certain molten metals due to inferior collapsability characteristics.

It was discovered that the water content in the resinous core binder adversely and disproportionately affects the rate of cure of the resin. Water contents up to about 5% by weight ordinarily can be tolerated but it is preferred that the resinous material be substantially water-free to obtain optimum curing characteristics. In the preparation of the resin, sometimes a small quantity of water is initially introduced in the kettle to provide an agitated medium to which the ingredients can be added and to provide for solution of the alkaline addition component as well as a control of viscosity of the resultant product. However, it is preferred to initially introduce furfuryl alcohol into the kettle to which is added a concentrated aqueous solution of a dissolved alkaline catalyst or component for control of the pH of the reaction medium. It is also preferred that the formaldehyde component be introduced in the form of paraformaldehyde in lieu of aqueous solutions of formaldehyde, such as for example, formalin. Paraformaldehyde which is commercially available in a powdered or flake form containing about 9% moisture is satisfactory for preparing the resinous composition herein disclosed. To maintain the mixture of urea, formaldehyde and furfuryl alcohol above a pH of 7.0 during the preliminary reaction and during the subsequent storage thereof, a suitable inorganic or organic alkaline catalyst or component is employed such as, for example, an alkali metal hydroxide or carbonate, or diethanolamine or triethanolamine. The quantity used should not be excessive so that the acid catalyst subsequently mixed therewith will not be consumed in a neutralization reaction instead of liberating hydrogen ions to catalyze the exothermic curing of the thermosetting resin. Generally, the reaction is carried out at a pH ranging from 7.0 to about 9.0, and preferably from about 7.3 to about 7.7.

Any one of a number of suitable acid catalysts may be employed for hardening the resins in concentrations depending upon the rate of the curing reaction desired. Acid catalysts suitable for this purpose include ferric chloride, ammonium chloride, phosphoric acid, hydrochloric acid, oxalic acid and lactic acid. In the preferred practice of this invention the salts of strong acids such as, for example, ammonium chloride are used in the form of aqueous solutions which provide safety in handling and facilitate distribution of the catalyst in the sand mixture. The concentration of the aqueous catalyst solution should be adjusted so as to provide a volume sufficient to enable uniform distribution in the sand mixture while simultaneously avoiding introducing an excessive quantity of water. Concentrations providing a pH ranging from about 1.0 to 6.8 are satisfactory for this purpose. A catalyst comprising 10 parts by weight of water, having dissolved therein 3 parts by weight of ammonium chloride has satisfactorily catalyzed the resinous core binder when used in amounts ranging from about 5% to about 30% by weight of the resin. It has also been found that an unexpected reduction in the evolution of fumes during the curing of the resinous core binder is achieved by incorporating in the aqueous catalyst solution an amount of urea ranging from about 1 part by weight to about 10 parts by weight, based on 10 parts of water. Urea containing catalysts of the aforementioned concentrations have been used satisfactorily for catalyzing the resinous core binder herein described which have included from about 1 to about 3.5 parts by weight of $NH_4Cl$. In addition to reducing the volume of fumes evolved during the curing cycle, the presence of urea in the catalyst also stabilizes the solution and prevents the precipitation of ammonium chloride therefrom during prolonged periods of storage.

The resinous core binder may be used with any of the conventional foundry sands for making sand molds, shell molds, sand cores, and the like. The amount of resinous core binder required based on a weight percent of the total sand mixture can range from about 0.5% to about 6% and is dependent upon the fineness of the sand as well as the tensile strength required in the cured sand product. As the fineness of the sand increases the surface area thereof increases and accordingly, a greater quantity of resinous binder is required to coat the sand particles to achieve satisfactory strength on curing. For example, 2% by weight of the resinous core binder generally is adequate when admixed with a Muskegon type lake sand (AFS fineness of 55) whereas 3% to 4% by weight of the resinous core binder is ordinarily required with a Vassar type bank sand (AFS fineness of 115). Sand molds and cores made from the aforementioned sand mixtures after proper curing have tensile strengths of over 300 pounds per square inch. The amount of catalyst used, expressed in terms of percent by weight of the resinous core binder employed can vary from about 5% to 30% by weight depending upon the curing rate desired.

The preparation of the admixture of sand, catalyst, and resinous core binder can be made in any one of a number of well known foundry sand mixers such as a Baker Perkins, a Simpson, or a Beardsley Piper mixer which provide a substantially homogeneous mixture in a matter of a few minutes. In accordance with the preferred practice of the present invention a measured quantity of a substantially dry foundry sand is first introduced into a suitable foundry sand mixer to which a measured quantity of the aqueous catalyst solution is added and mixed for a period of about 30 seconds. An appropriate measured quantity of the resinous core binder, preferably in a liquid form, is then added to the catalyzed sand mixture and blended for a period of from about one to four minutes depending upon the efficiency of the mixer. The resultant coated and catalyzed sand mixture has good flowability characteristics and relatively low green strength which constitutes another advantage of the present invention in that these features facilitate blowing the mixture by means of a compressed fluid propelling medium such as air, for example, into heated core boxes and patterns in the preparation of cores and molds. The patterns against which the sand mixture is applied are ordinarily preheated to a temperature ranging from about 200° F. to about 550° F. and more conventionally, from about 350° F. to about 400° F. The curing time which is determined by the length of time that the sand mixture is in contact with the heated pattern can range from about 5 to about 30 seconds dependent on the specific formulation of the resinous core binder, the amount used in the sand mixture, and the type and concentration of the catalyst employed. Curing times of the above duration are usually sufficient to adequately harden the resinous core binder in sand molds and cores having sections up to one inch in thickness. The center of a core may not be completely cured in 5 to 30 seconds contact with the pattern, but a sufficiently rigid shell will form enabling stripping the core from the pattern. After stripping, the exothermic curing reaction continues causing the core to cure throughout before it cools.

It will of course be appreciated that the resinous core binder is not limited to applications wherein the sand mixture is blown against heated patterns such as employed in automated foundry machinery. The rapid curing characteristics and high strength of the resinous core binder also provide significant advantages in the manufacture of sand molds and cores by any one of the well known foundry sand mold manufacturing techniques. As a matter of fact, the extreme versatility of the unique resinous core binder enables the manufacture of molds and cores by any method which provides means for applying heat to the preliminarily formed green sand mixture to initiate the curing reaction. Heating of the mixture can be achieved by direct flame, conventional foundry ovens, dielectric heating, infrared heating, heated air, etc., as well as the aforementioned technique employing heated patterns. For example, a core or mold can be blown cold and thereafter cured by applying and penetrating the preliminarily formed core with heated air usually at a temperature of at least about 200° F. and for a period of time sufficient to initiate the curing reaction. Highly satisfactory results also have been obtained by forming cold cores in conventional core boxes and thereafter heating the core in conventional foundry ovens for periods of time substantially shorter than heretofore required with other sand binding agents to produce a high strength completely cured core.

A further advantage of the resinous core binder herein disclosed is the long bench life of the green sand mixture containing appropriate quantities of the binder and catalyst. This characteristic is surprising in view of its rapid curing characteristics when subjected to heat. Bench lives in the order of from about 3 to 8 hours are readily obtainable which provide for greater foundry flexibility enabling the preparation of large batches of sand which can be satisfactorily used over a prolonged period of time without requiring special handling.

In addition to the foregoing superior characteristics of the resinous core binder, it has been found that molds and cores produced from sand mixtures containing an appropriate quantity of binder and catalyst have unusual release characteristics, dimensional stability, and collapsability characteristics. Accordingly, it has been found that only little, and quite often none of the conventional mold release compounds heretofore used are required with the sand mixtures containing the binder herein described. This, of course, not only constitutes a saving in mold release compounds, but moreover, decreases the time interval between the manufacture of successive sand cores and molds. The exceptional dimensional stability and freedom of warpage of the sand molds and cores on cooling and during pouring of the molten metal also provides advantages in providing castings of greater dimensional accuracy, enabling pouring of thinner wall sections with a corresponding reduction of weight, and substantially reducing machining operations of the cast articles. The superior collapsability characteristic of molds and cores incorporating the resinous core binder also enables the satisfactory casting of a variety of metals differing substantially in their pouring temperatures without encountering difficulty in removing the core from the solidified cast article. Accordingly, iron which is usually poured at a temperature of about 2500° F. to 2700° F. and aluminum which is usually poured at a temperature of about 1200° F. to 1400° F. heat the sand molds and cores to different degrees which heretofore required the utilization of different binders for each application. However, it has been found that the resinous core binder herein disclosed is equally applicable for making sand molds and cores for pouring high as well as low temperature metals and obtaining excellent collapsability characteristics under these conditions.

The following examples are provided to further illustrate typical compositions of the resinous core binder comprising the present invention and the curing characteristics thereof when used in various types of foundry sand. It will be understood that the examples are provided by way of illustration and are not intended to be limiting in any way.

EXAMPLE I (a) To a kettle provided with suitable agitation means, the following materials were charged:

| | Parts |
|---|---|
| Water | 36 |
| Sodium carbonate | 1 |
| Furfuryl alcohol | 720 |
| Urea | 450 |
| Paraformaldehyde (91%) | 700 |

The water is initially charged into the kettle followed by a warm concentrated aqueous solution of sodium carbonate to which is subsequently added the furfuryl alcohol. Then the urea is added followed thereafter by paraformaldehyde. The mixture at a pH above 7.0 is continuously agitated and heated over a thirty minute period up to a temperature of about 225° F. at which it is thereafter maintained for approximately ninety minutes to effect copolymerization of the ingredients. The resin is thereafter cooled by passing it through a suitable heat exchanger to a temperature of below 150° F. This resin represents a composition having a formaldehyde to urea molar ratio of about 2.83 to 1 and a furfuryl alcohol to urea molar ratio of about .98 to 1.

(b) A catalyst suitable for curing the resinous core binder is prepared by charging a kettle with the following materials:

| | Parts |
|---|---|
| Water at about 150° F. | 9 |
| Urea | 9 |
| Ammonium chloride | 3 |

The water is preheated to about 150° F. in the kettle provided with good agitation. The urea is then added followed by the ammonium chloride which reduces the temperature of the solution to about 50° F. due to the endothermic heat of solution. The solution is then heated to a temperature of about 75° under continuous agitation to assure complete solution of all materials. The resultant catalyst solution will remain clear and free from precipitation indefinitely at temperatures of over 15° F.

Two percent by weight of the resinous core binder prepared in accordance with (a) above and 20% by weight of the resin used (0.4% by weight of the total mixture) of the catalyst prepared in accordance with (b) above were blended in a suitable foundry sand mixer with a substantially dry Muskegon type lake sand.

Similarly, 3% by weight of the resin prepared in accordance with (a) above together with 20% by weight based on the resin used (0.6% by weight of the total mixture) of the catalyst prepared in accordance with (b) above were blended with a Vassar type bank sand in a suitable foundry mixer. The Muskegon lake sand mixture and Vassar bank sand mixture were each blown at compressed air pressures of about 60 pounds per square inch against a pattern heated to a temperature of about 400° F. and allowed to remain in contact therewith for controlled cure time periods forming therewith tensile specimens in accordance with accepted AFS Standards. Variations in the tensile strength of the specimens prepared from the Muskegon lake sand mixtures and Vassar bank sand mixtures in relationship to the cure time in seconds are tabulated in the table below.

*Table I*

| | Tensile Strength, p.s.i. | |
|---|---|---|
| Cure Time (Seconds) | Muskegon Lake Sand, 2% by wt. Resin | Vassar Bank Sand, 3% by wt. Resin |
| 5 | 58 | 20 |
| 10 | 313 | 53 |
| 15 | 328 | 144 |
| 20 | 304 | 201 |
| 30 | 312 | 250 |
| 40 | 320 | 264 |
| 50 | 312 | 283 |
| 60 | 337 | 315 |

EXAMPLE II

A kettle provided with suitable agitation was charged with the following materials:

| | Parts |
|---|---|
| Furfuryl alcohol | 40 |
| Sodium carbonate | .05 |
| Urea | 30 |
| Paraformaldehyde (91%) | 33 |

The mixture was heated according to the procedure described in Example I (a). The foregoing resin represents a composition having a formaldehyde to urea molar ratio of 2:1 and a furfuryl alcohol to urea molar ratio of .82:1.

EXAMPLE III

A kettle provided with suitable agitation was charged with the following materials:

| | Parts |
|---|---|
| Furfuryl alcohol | 40 |
| Sodium carbonate | .05 |
| Urea | 20 |
| Paraformaldehyde (91%) | 44 |

The materials were agitated and heated in accordance with the method described in Example I(a). The resulting resinous binder is representative of a composition comprising a furfuryl alcohol to urea molar ratio of 1.24:1 and a formaldehyde to urea molar ratio of 4:1.

EXAMPLE IV

The resinous core binders of Example II and Example III were separately mixed with measured quantities of Lake Michigan type foundry sand at a concentration of 2% by weight resin and 20% by weight based on the resin used of the catalyst prepared in accordance with Example I(b). The resultant sand mixtures were then blown at an air pressure of about 80 pounds per square inch against a tensile specimen pattern heated to a temperature of about 400° F. The results of the tensile strength of the tensile specimens prepared are tabulated below for cure times ranging from 5 seconds to 60 seconds.

*Table II*

| | Tensile Strength, p.s.i. | |
|---|---|---|
| Cure Time (Seconds) | 2% by wt. resin of Example II | 2% by wt. resin of Example III |
| 5 | 0 | 211 |
| 10 | 45 | over 370 |
| 15 | 112 | over 370 |
| 20 | 223 | over 370 |
| 30 | 252 | over 370 |
| 40 | 277 | over 370 |
| 50 | 320 | over 370 |
| 60 | 353 | over 370 |

What is claimed is:

1. A process for making sand molds and cores comprising the steps of admixing an acid catalyst and resinous core binder with a foundry sand, said resinous core binder being present in an amount of from about 0.5% to about 6% by weight and comprising an alkaline copolymerization product of a mixture consisting essentially of formaldehyde, urea, furfuryl alcohol, and an alkaline catalyst in the proportions of greater than 2 and up to about 4 moles formaldehyde and from about 0.1 to about 1.7 moles furfuryl alcohol per mole urea and a sufficient quantity of said alkaline catalyst to maintain said resinous core binder at a pH of from at least 7.0 to about 9.0 prior to admixture with said acid catalyst, said acid catalyst being present in a quantity sufficient to reduce the pH of said resinous core binder below 7.0, continuing said mixing until a substantially uniform mixture is obtained, and thereafter applying said mixture to a heated pattern for a period of time sufficient to initiate curing of said resinous core binder.

2. A process for making sand molds and cores comprising the steps of mixing into a substantially dry foundry sand an aqueous acid catalyst solution in a quantity sufficient to reduce the pH of a resinous core binder below 7.0, thereafter admixing with said foundry sand said resinous core binder in an amount ranging from about 1% to about 6% by weight, said resinous core binder comprising an alkaline copolymerization product of a mixture consisting essentially of formaldehyde, urea, furfuryl alcohol, and an alkaline catalyst in the proportions of greater than 2.0 and up to about 4 moles of formaldehyde and from about 0.1 to about 1.7 moles furfuryl alcohol per moles urea and a sufficient quantity of said alkaline catalyst to maintain said resinous core binder at a pH of from at least 7.0 to about 9 prior to admixture with said acid catalyst, continuing said mixing until a substantially uniform mixture is obtained, and thereafter applying said mixture to a heated pattern for a period of time sufficient to initiate curing of said resinous core binder.

3. A process for making sand molds and cores comprising the steps of mixing into a substantially dry foundry sand an aqueous acid catalyst solution in a quantity sufficient to reduce the pH of a resinous core binder below 7.0, thereafter admixing with said foundry sand said resinous core binder in an amount ranging from about 0.5% to about 6% by weight, said resinous core binder comprising an alkaline copolymerization product of a mixture consisting essentially of formaldehyde, urea, furfuryl alcohol, and an alkaline catalyst in the proportions ranging from about 2.4 to about 3.0 moles of formaldehyde and from about .7 to about 1.3 moles furfuryl alcohol per moles urea and a sufficient quantity of said alkaline catalyst to maintain said resinous core binder at a pH of from about 7.3 to about 7.7 prior to admixture with said acid catalyst continuing said mixing until a substantially uniform mixture is obtained, and thereafter applying said mixture to a pattern heated to a temperature ranging from about 200° F. to about 550° F. for a period of time sufficient to initiate curing of said resinous core binder.

4. A process for making sand molds and cores comprising the steps of mixing into a substantially dry foundry sand mixture an aqueous acid catalyst solution consisting essentially of about 10 parts water, from about 0.5 to about 10 parts urea, and from about 1 to about 3.5 parts ammonium chloride in an amount ranging from about 5% to about 30% of the weight of a resinous core binder, admixing into said sand mixture a resinous core binder in an amount of from about 0.5% to about 6% by weight, said resinous core binder comprising an alkaline copolymerization product of a mixture consisting essentially of formaldehyde, urea, furfuryl alcohol, and an alkaline catalyst and the proportions ranging from about 2.4 to about 3.0 moles of formaldehyde and from about .7 to about 1.3 moles furfuryl alcohol per moles urea and a sufficient quantity of said alkaline catalyst to maintain said resinous core binder at a pH of from about 7.3 to about 7.7 prior to admixture with said aqueous acid catalyst solution, continuing said mixing until a substantially uniform mixture is obtained, and thereafter applying said mixture to a pattern heated to a temperature ranging from about 200° F. to about 550° F. for a period of time sufficient to initiate curing of said resinous core binder.

5. A process for making sand molds and cores comprising the steps of admixing an acid catalyst and resinous core binder with a foundry sand, said resinous core binder being present in an amount of from about 0.5% to about 6% by weight and comprising an alkaline copolymerization product of a mixture consisting essentially of formaldehyde, urea, furfuryl alcohol, and an alkaline catalyst in the proportions of greater than 2 and up to about 4 moles formaldehyde and from about 0.1 to about 1.7 moles furfuryl alcohol per mole urea and a sufficient quantity of said alkaline catalyst to maintain said resinous core binder at a pH of from at least 7.0 to about 9.0 prior to admixture with said acid catalyst, said acid catalyst being present in a quantity sufficient to reduce the pH of said resinous core binder below 7.0, continuing said mixing until a substantially uniform mixture is obtained, and thereafter molding said mixture to the desired configuration and applying heat thereto for a period of time sufficient to initiate curing of said resinous core binder.

6. A process for making sand molds and cores comprising the steps of admixing an acid catalyst and resinous core binder with a foundry sand, said resinous core binder being present in an amount of from about 0.5% to about 6% by weight and comprising an alkaline copolymerization product of a mixture consisting essentially of formaldehyde, urea, furfuryl alcohol, and an alkaline catalyst in the proportions of greater than 2 and up to about 4 moles formaldehyde and from about 0.1 to about 1.7 moles furfuryl alcohol per mole urea and a sufficient quantity of said alkaline catalyst to maintain said resinous core binder at a pH of from at least 7.0 to about 9.0 prior to admixture with said acid catalyst, said acid catalyst being present in a quantity sufficient to reduce the pH of said resinous core binder below 7.0, continuing said mixing until a substantially uniform mixture is obtained, and thereafter molding said mixture to the desired configuration and raising the temperature of at least a portion thereof above about 200° F. by contacting and penetrating the molded said mixture with heated air for a period of time sufficient to initiate curing of said resinous core binder.

7. A process for making sand molds and cores comprising the steps of admixing an acid catalyst and resinous core binder with a foundry sand, said resinous core binder being present in an amount of from about 0.5% to about 6% by weight and comprising an alkaline copolymerization product of a mixture consisting essentially of formaldehyde, urea, furfuryl alcohol, and an alkaline catalyst in the proportions of greater than 2 and up to about 4 moles formaldehyde and from about 0.1 to about 1.7 moles furfuryl alcohol per mole urea and a sufficient quantity of said alkaline catalyst to maintain said resinous core binder at a pH of from at least 7.0 to about 9.0 prior to admixture with said acid catalyst, said acid catalyst being present in a quantity sufficient to reduce the pH of said resinous core binder below 7.0, continuing said mixing until a substantially uniform mixture is obtained, and thereafter molding said mixture to the desired configuration and heating the molded said mixture in an oven to raise the temperature of at least a portion thereof to above about 200° F. for a period of time sufficient to initiate curing of said resinous core binder.

8. A sand mold and core made in accordance with the process described in claim 1.

9. A sand mold and core made in accordance with the process described in claim 3.

References Cited by the Examiner

UNITED STATES PATENTS

| | | | |
|---|---|---|---|
| 1,991,810 | 2/1935 | Lilienfeld | 260—69 |
| 2,335,701 | 11/1943 | Root | 260—70 |
| 2,413,624 | 12/1946 | Harris | 260—39 |
| 2,422,118 | 6/1947 | Meyer | 260—39 |
| 2,510,496 | 6/1950 | Carlin | 260—70 |
| 2,518,388 | 8/1950 | Simons | 260—39 |
| 2,634,255 | 4/1953 | Patterson | 260—70 |
| 2,662,066 | 12/1953 | Clark et al. | 260—70 |
| 2,668,155 | 2/1959 | McClellan | 260—70 |
| 2,953,535 | 9/1960 | Salzberg et al. | |
| 3,008,205 | 11/1961 | Blaies. | |
| 3,020,609 | 2/1962 | Brown et al. | |

FOREIGN PATENTS 1,050,026  2/1959  Germany.

MORRIS LIEBMAN, *Primary Examiner.*

ALLAN M. BOETTCHER, MORRIS STERMAN,
*Examiners.*

R. W. GRIFFIN, A. H. KOECKERT,
*Assistant Examiners.*